(12) United States Patent
Chae et al.

(10) Patent No.: US 6,446,591 B1
(45) Date of Patent: Sep. 10, 2002

(54) AIR GAP FILLER FOR A MULTI-PORTION AIR DIRECTING MANIFOLD

(75) Inventors: David Jeungsuck Chae, Windsor (CA); Karthik Narayan, Dearborn; Kevin Arthur Murphy, Sterling Hts., both of MI (US)

(73) Assignee: Siemens VDO Automotive Inc., Tilbury ( * ) Notice: Subject to any disclaimer, the term of this patent is extended or adjusted under 35 U.S.C. 154(b) by 14 days.

(21) Appl. No.: 09/689,519

(22) Filed: Oct. 12, 2000

Related U.S. Application Data

(60) Provisional application No. 60/158,919, filed on Oct. 12, 1999.

(51) Int. Cl.[7] ............................................. F02M 35/10
(52) U.S. Cl. ............................ 123/184.61; 123/184.55
(58) Field of Search .................... 123/184.42, 184.47, 123/184.53, 184.55, 184.61

(56) References Cited

U.S. PATENT DOCUMENTS

| | | |
|---|---|---|
| 5,005,535 A | 4/1991 | Binversie et al. |
| 5,062,405 A | 11/1991 | Daly |
| 5,094,194 A | 3/1992 | Rush, II et al. |
| 5,097,594 A | 3/1992 | Daly et al. |
| 5,657,733 A | 8/1997 | Dozier et al. |
| 5,715,782 A | 2/1998 | Elder |
| 5,826,553 A | 10/1998 | Nakayama et al. |
| 6,092,498 A | 7/2000 | Lohr et al. |
| 6,199,530 B1 * | 3/2001 | Brassell et al. ........ 123/184.34 |

FOREIGN PATENT DOCUMENTS

| | | |
|---|---|---|
| DE | 3240196 | 5/1984 |
| DE | 8914049 | 11/1989 |
| DE | 19814979 | 10/1999 |
| EP | 0848145 | 10/1997 |
| EP | 0861977 | 2/1998 |
| GB | 2279035 | 12/1994 |

* cited by examiner

Primary Examiner—Noah P. Kamen

(57) ABSTRACT

A fluid directing assembly includes partitions which define fluid directing runners. The partitions extend from a first portion and include an engagement member extending therefrom. The engagement members extend from the partitions such that an interference fit is formed between the first portion and a second portion of the module. The engagement members assure that fluid communication between runners adjacent the apertures formed by the separate portions is prevented.

24 Claims, 5 Drawing Sheets

AIR GAP FILLER FOR A MULTI-PORTION AIR DIRECTING MANIFOLD

The present application claims priority to U.S. Provisional Patent Application Serial No. 60/158,919, filed Oct. 12, 1999.

BACKGROUND OF THE INVENTION

The present invention relates to a vehicle fluid directing assembly, and more particularly to an air intake manifold having partition engagement members which assure that each runner defines an independent consistent and optimized airflow path.

Various types of air induction components such as air induction manifolds, air filter assemblies and throttle bodies are used in the field of internal combustion engines. Many known air induction components are presently manufactured of a non-metallic material such as nylon to simplify fabrication and reduce weight.

One of the major factors that influences engine performance as determined by the air intake manifold, is the airflow runner length and its sectional area in the air intake manifold. The best torque characteristic in low engine speed range can be obtained by having the air flow through long runner length with small sectional area, while the best torque in high speed range can be obtained by flow of air through short runner length and larger sectional area.

A non-metallic intake manifold having multiple portions may have mismatched areas due to normal manufacturing variations that allow internal air leakage (cross-flow) between airflow passages. This leakage affects the torque tuning for specific engine speed. Further the leakage may also adversely affect Noise Vibration and Harshness (NVH) characteristics of the intake manifold module. Due to the complexity of the internal shapes and manufacturing variations, manifolds may not have consistent runners.

Accordingly, it is desirable to assure that the runners are consistently manufactured to minimize gaps and cross-flow to provide consistent characteristic in an intake manifold module.

SUMMARY OF THE INVENTION

The present invention provides a vehicle fluid directing assembly such as an air intake manifold module formed of a multiple of fluid directing portions. Each portion mates with another portion at a weld area by known sonic welding or other attachment methods.

The module includes a multiple of runners. Apertures of the runners within a first portion align with second portion apertures when the portions are assembled together to form the module. Separating each of the first portion apertures from each of the other first portion apertures is a first portion partition. First portion partitions align with corresponding second portion partitions and first portion apertures align with second portion apertures.

Each of the partitions extending form the first portion preferably includes an engagement member extending therefrom. The engagement member extends from each partition such that an interference fit is formed between the first portion and the second portion. The engagement members assure that fluid communication between runners adjacent the apertures is prevented. The engagement member fills openings during the assembly process without impeding assembly to assure the modules are optimized by consistently sealing internal gaps.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
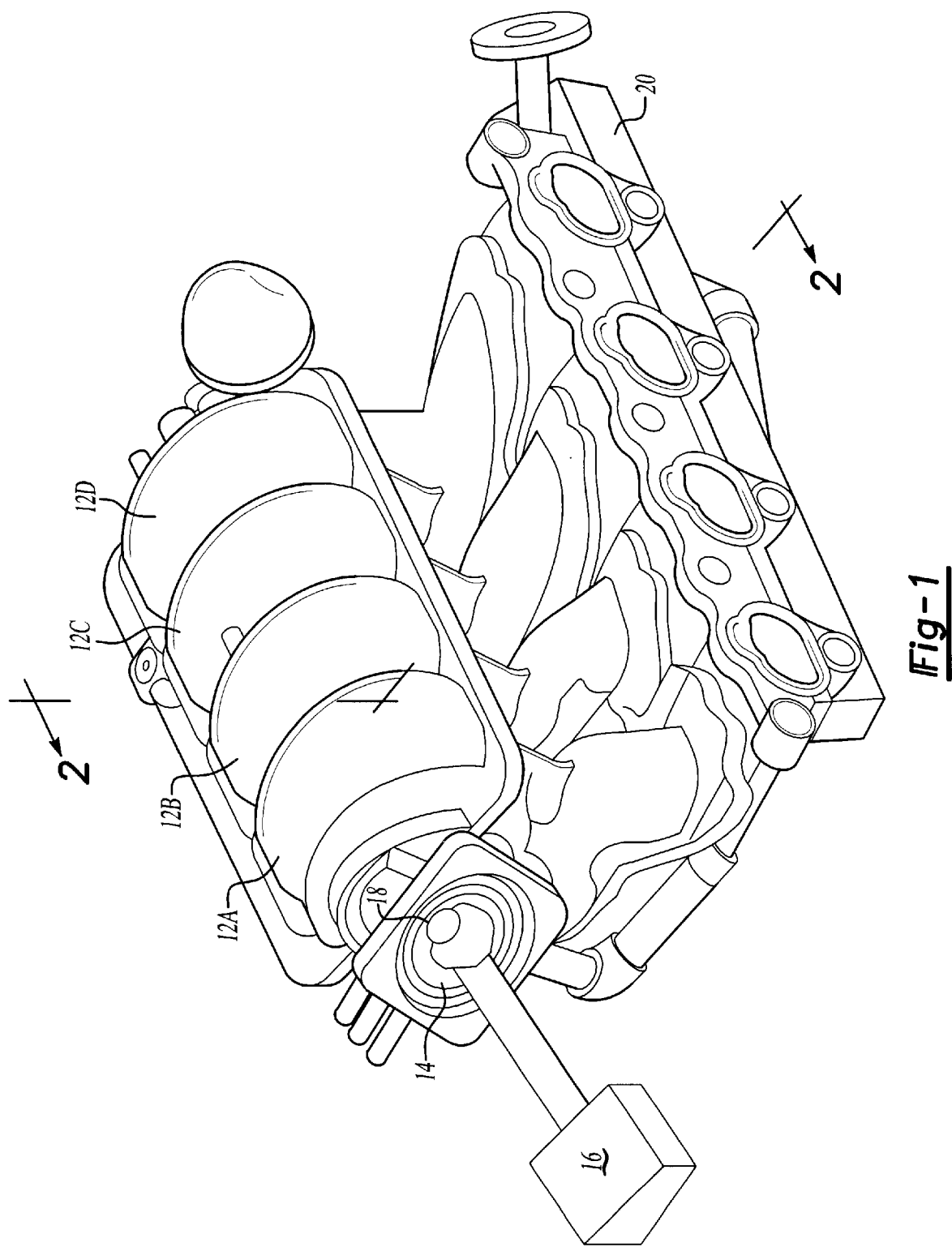
FIG. 1 is a general perspective view of a vehicle fluid directing assembly designed according to the present invention.

FIG. 1 illustrates a vehicle fluid directing assembly 10 such as an air intake manifold module 10. The module 10 is preferably manufactured of a non-metallic material such as nylon, PET, LCP, PPC, PBT or various other plastics. The module 10 defines a multiple of runners 12. An intake port 14 typically communicates with a vehicle air induction system (illustrated schematically at 16) to communicate air into a plenum 18. From the plenum 18, the air is communicated through each runner 12 to an associated cylinder (illustrated schematically at 20) for compression and combustion.

Figure 1A:
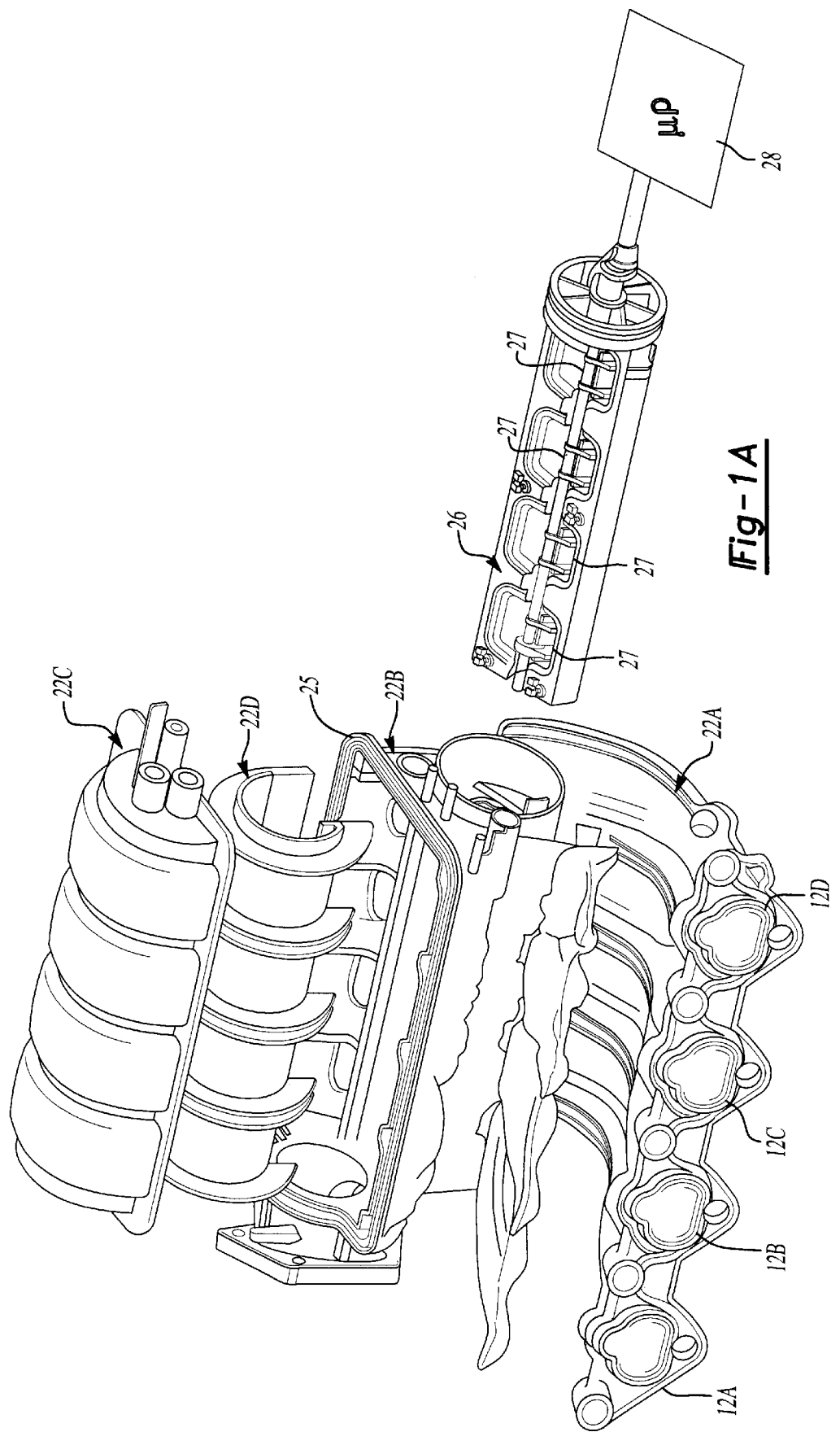
FIG. 1A is a general exploded view of a vehicle fluid directing assembly designed according to the present invention.

Referring to FIG. 1A, an exploded view of the module 10 illustrates that the module 10 is preferably formed of a multiple of fluid directing portions 22A–22D typically due to the complexity of molding the module 20 as a single component. Each portion 22A–22D mates to another portion 22A–22D at a weld area 24 (FIG. 2) by known sonic welding or other attachment methods to form the final module 10. An active system 26 locates a movable valve 27 within each runner 12. portion 22A–22D mates to another portion 22A–22D at a weld area 24 (FIG. 2) by known sonic welding or other attachment methods to form the final module 10. An active system 26 locates a movable valve 27 (also illustrated in FIG. 2A) within each runner 12.

Figure 2:
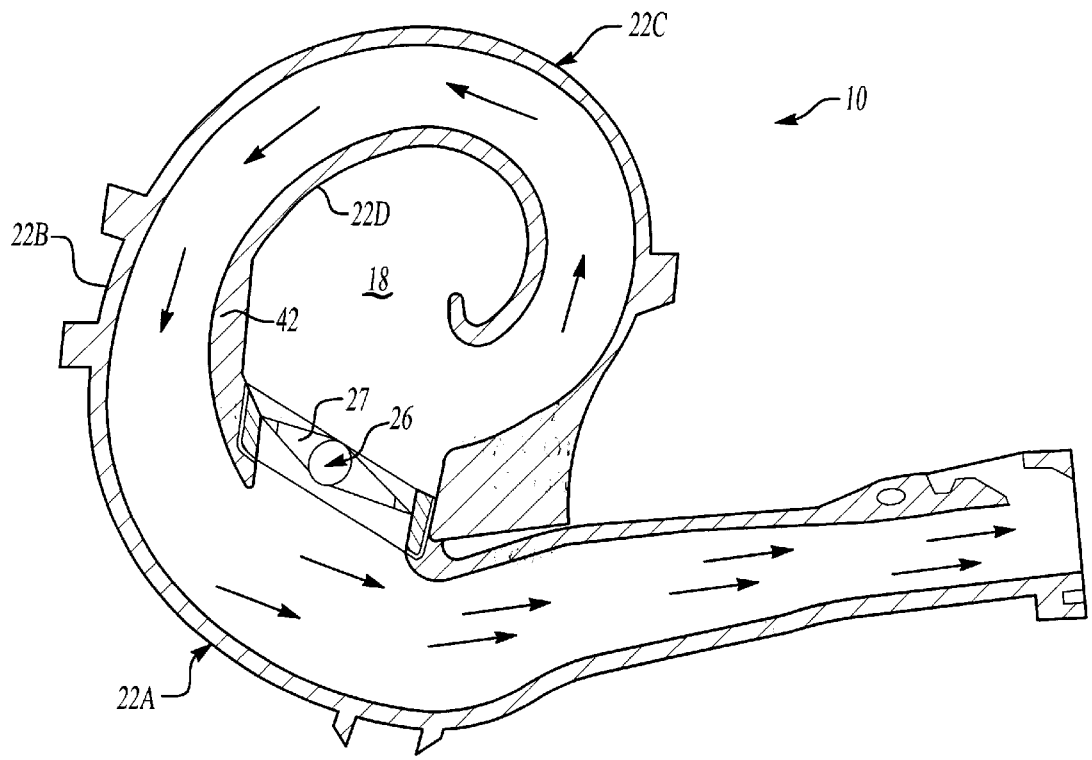
FIG. 2 is a sectional view illustrating alternate air flow paths taken along the line 2—2 in FIG. 1.

Referring to FIG. 2, an active system 26 locates a movable valve 27 within each runner 12. The moveable valve 27 tunes the length of the runner 12 to define an optimal air flow path in response to predefined inputs from a controller (illustrated schematically at 28). When the active system 26 is closed, the air (illustrated by solid arrows A) flows from the plenum 18 along a relatively longer path to the cylinder 20. When the active system 26 is open, the air (illustrated by phantom arrows A) passes through the active system 26 to flow from the plenum 18 along a relatively shorter path to the cylinder 20. It should be understood that other fluid directing assemblies including non-active assemblies which includes a runner passing through a plurality of components would benefit from the present invention.

Figure 3:
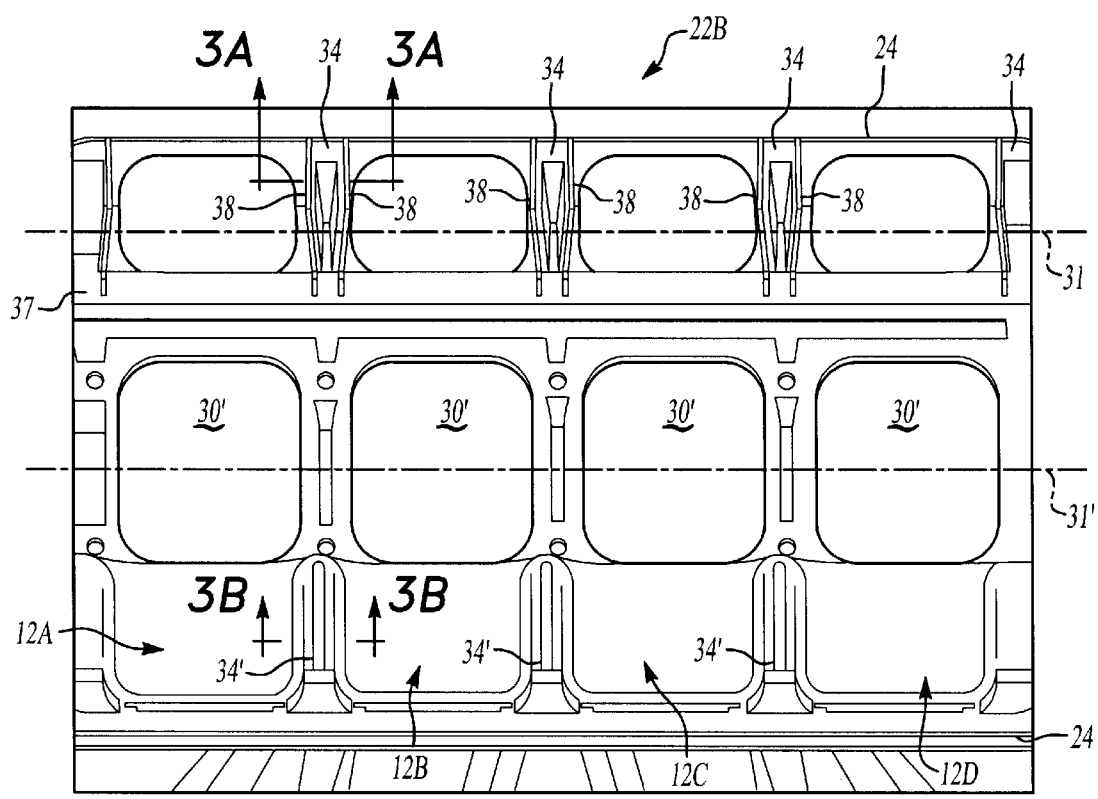
FIG. 3 is an expanded top view of one portion of the assembly according to the present invention.

Referring to FIG. 3, a top view of a first fluid directing portion 22B is illustrated. The weld areas 24 are preferably located around an outer perimeter area of each portion 22, however, other areas may be provided. Each runner 12 defines a first portion 22B passage portion 30, 30' due to the separation of the module 10 into a plurality of portions 22A–22C, passage portions 30, 30' are portions of the longer (passage portion 30) or shorter (passage portion 30') air flow path (FIGS. 3A and 3B) within a single runner 12. The passage portions 30, 30' are defined in the first portion 22B to align with second portion 22C passage portions 32, 32' (FIG. 3A) when the portions 22B and 22C are assembled together. Passage portions 30, 30' define a first axis 31, 31'. It should be understood that other modules formed of a plurality of portions in which a runner passes through each portion would benefit from the present invention.

Figure 3A:
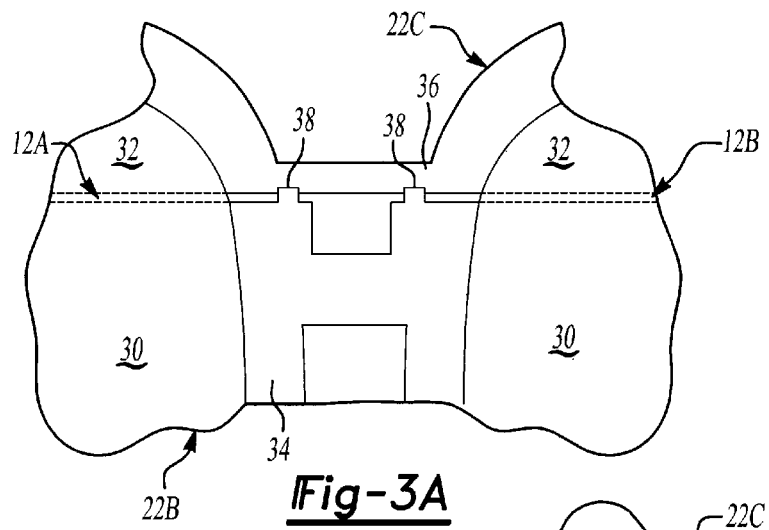
FIG. 3A is a sectional view of an engagement member taken along the line 3A—3A in FIG. 3.
Figure 3B:
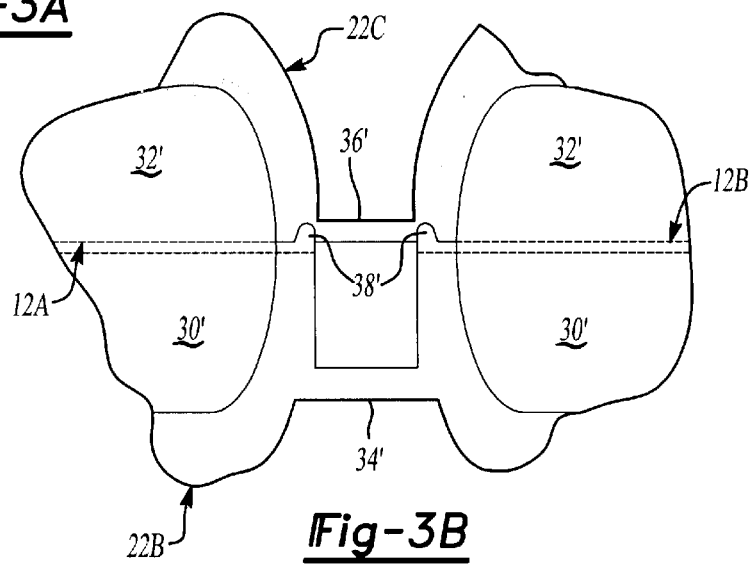
FIG. 3B is a sectional view of an engagement member taken along the line 3B—3B in FIG. 3.

Separating each of the first portion passage portions 30, 30' from each of the other first portion passage portions 30, 30' respectively is a first portion partition 34, 34'. Preferably, the partitions 34, 34' are located substantially perpendicular to the first axis 31, 31'. First portion 22B partitions 34, 34' align with corresponding second portion 22C partitions 36, 36' when the portions 22B and 22C are assembled (FIG. 3A and 3B). The partitions 34, 34', 36, 36' thus separate each runner 12 when the portions 22 are assembled.

Figure 3C:
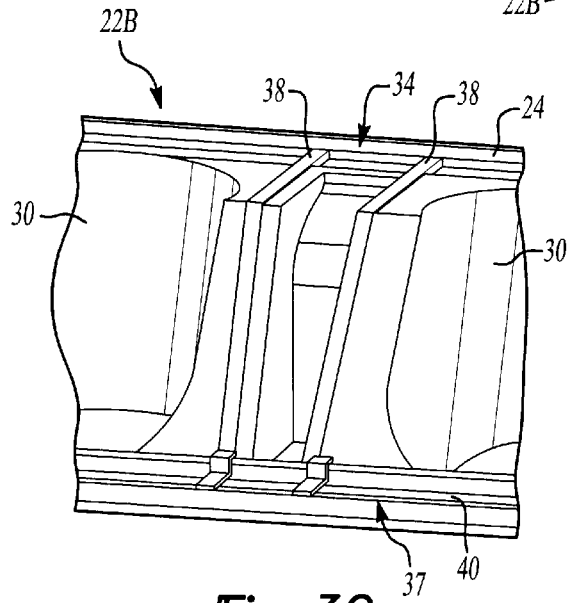
FIG. 3C is an enlarged perspective view of the engagement member in FIG. 3.

Each of the partitions 34, 34', extending form the first portion 22B includes an engagement member 38 extending therefrom. The engagement members 38 are preferably substantially square in cross-section and extend along the length of the partition 34 (FIG. 3C and FIG. 4B). By minimizing the cross-sectional area of the engagement members 38, 38' and 42, a smaller relatively compliant engagement surface is provided relative to the relatively larger partitions 34, 34'. The engagement member 38 extends from the partition, 34, 34' such that an interference fit is formed along the engagement member 38 between the first portion 22B and the second portion 22C. That is, the engagement member 38 assures sealing due to compliance of the engagement member 38, 38' (FIG. 3A, 3B and 3C) and/or penetration of the engagement member 42 (FIG. 3D) along the surface directly adjacent the engagement member 38, 38' or 42 when assembled. Typically, the partitions 34, 34', 36, 36' are not welded together as the portions 22A and 22C are fixed together only in weld areas 24 defined along a mating periphery 25 (FIG 1).

Figure 3D:
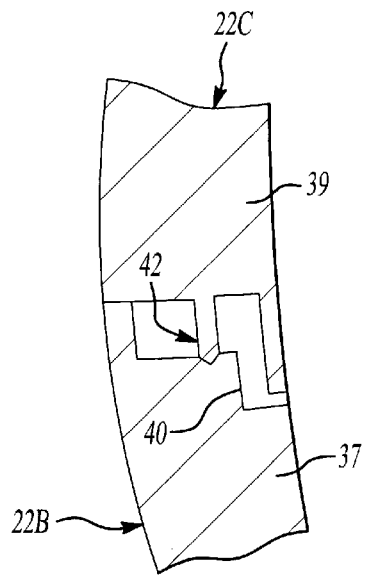
FIG. 3D is an enlarged perspective view of the engagement member in FIG. 3.

A first portion 22B longitudinal partition 37 aligns with a second portion 22C longitudinal partition 39 when the portions 22B, 22C are assembled (FIG. 3D). Preferably the longitudinal portion 37 is preferably located substantially parallel to the first axis 31.

Figure 4A:
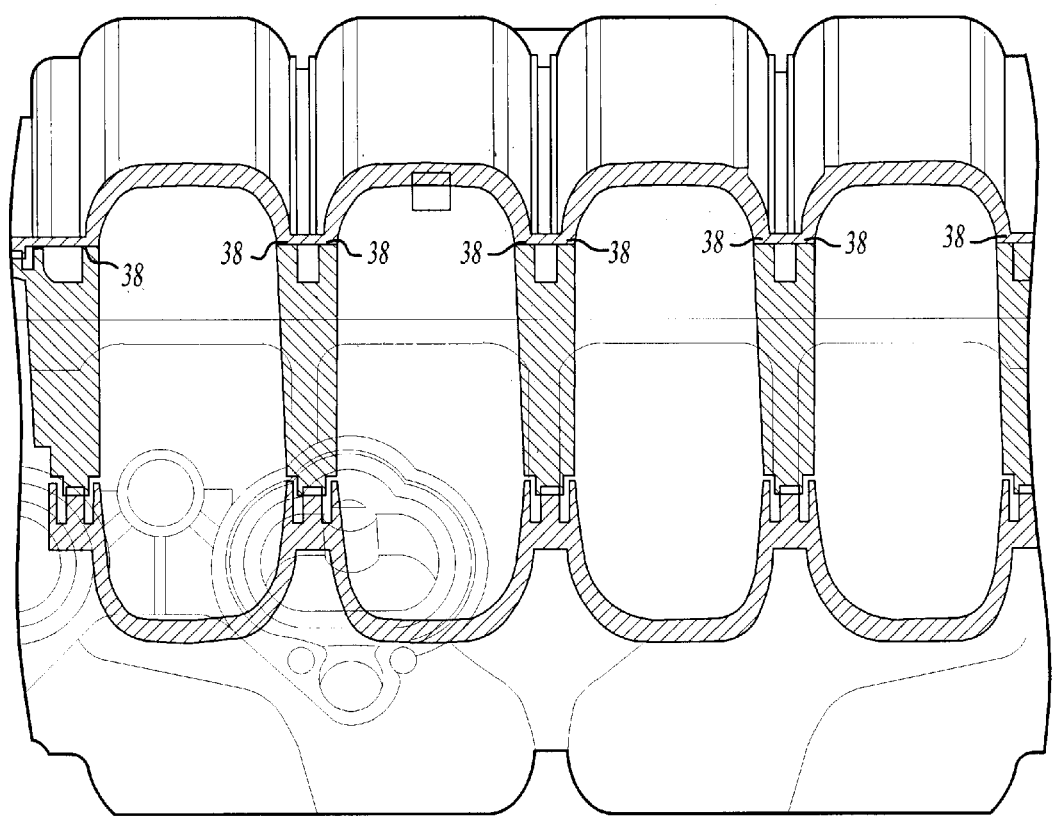
FIG. 4A is an assembled phantom view of an engagement illustrated in FIG. 3.
Figure 4B:
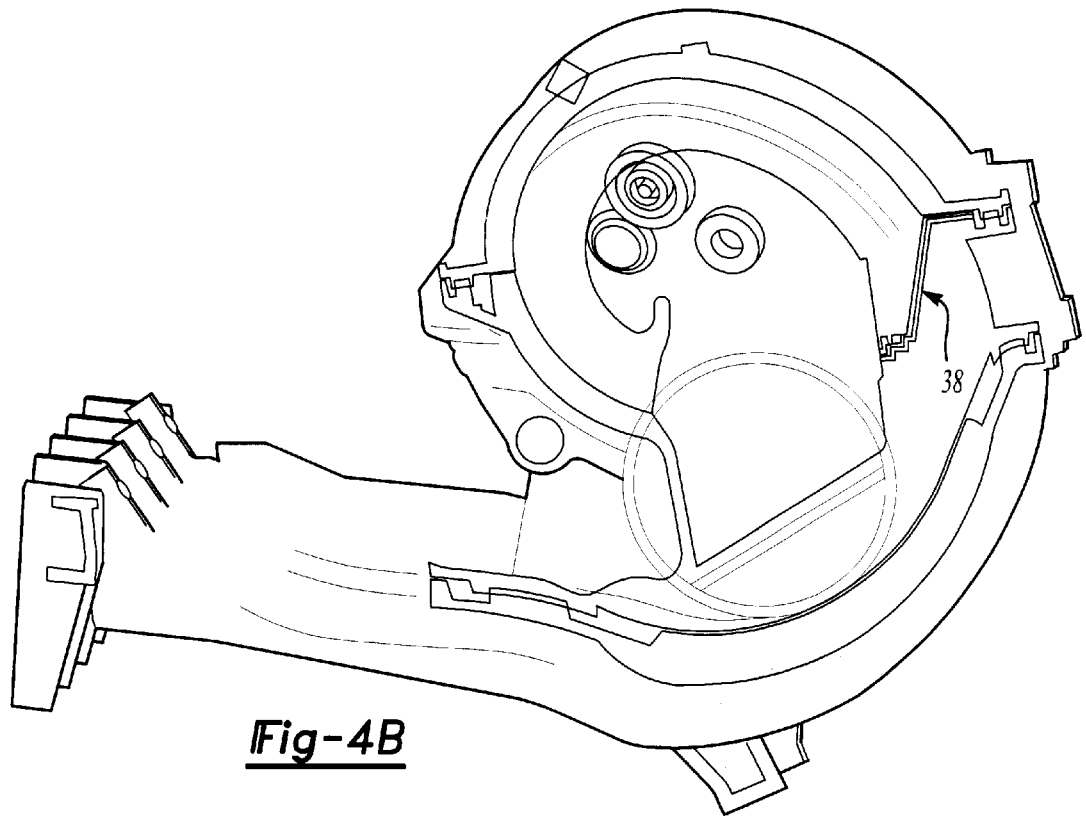
FIG. 4B is an assembled phantom view of an engagement illustrated in FIG. 3.

Referring to FIG. 3A, the partition 34 of the first portion 22B and the partition 36 of the second portion 22C are preferably designed to be in mating engagement when the first portion 22B and the second portion 22C are welded together in the weld areas 24 (FIG. 2). However, in some instances due to tolerances in the molding process the partitions 34 and partitions 36 may not be in contact. The engagement member 38 extends from the partition 34 to assure that there is contact between the engagement members 38 of the first partitions 34 of the first portion 22B with the partitions 36 of the second portion 22C (also illustrated in FIG. 4A). Accordingly, tho engagement member 38 assures tat fluid communication between runners 12 adjacent passage portions 30 is prevented. In other words, the runners 12 will not cross-leak in the vicinity of passage portions 30 when the module 10 is assembled.

Referring to FIG. 3B, the engagement member 38' extends from the partition 34' to assure that there is contact between the engagement member 38' of the first partitions 34' of the first portion 22B with the partitions 36' of the second portion 22C. Accordingly, the engagement member 38' assures that fluid communication between runners 12 adjacent passage portions 30' is prevented. In other words, the runners 12 will not cross-leak in the vicinity of passage portions 30' when the module 10 is assembled.

Referring to FIG. 3D, the first portion 22B longitudinal partition 37 is alignable with the second portion 22C longitudinal partition 39 when the portions 22B, 22C are assembled. The longitudinal partition 37 includes a substantially step shaped surface 40 and the longitudinal partition 39 includes an engagement member 42. The engagement member 42 assures there is contact between the longitudinal partitions 37, 39 by providing an interference fit between the longitudinal partitions 37, 39. Portions 37,39 are typically not welded together as this area of the module 10 (FIG. 2) is usually not accessible. The engagement member 42 assures that the plurality of passage portions 34 in the first portion 22B which are in communication with corresponding plurality of passage portions 36 in the second portion 22C will not be in fluid communication with the passage portions 34' in the first portion 22B which are in fluid communication with the plurality of the passage portions 36' in the second portion 22C. In other words, the longitudinal partitions 37, 39' assures the continuity of each runner 12.

The foregoing description is exemplary rather than limiting in nature. Many modifications and variations of the present invention are possible in light of the above teachings. The preferred embodiments of this invention have been disclosed, however, one of ordinary skill in the art would recognize that certain modifications are possible that would come within the scope of this invention. It is, therefore, to be understood that within the scope of the appended claims, the invention may be practiced otherwise than as specifically described. For that reason the following claims should be studied to determine the true scope of protection given for this invention.

What is claimed is:

1. A fluid directing assembly for a vehicle comprising:

a first fluid directing portion including a first portion first passage portion and a first portion second first passage portion and separated by a first portion partition having an engagement member extending from said first portion partition; and a second fluid directing portion attachable to said first fluid directing portion along a weld, said second fluid directing portion comprising a second portion first passage portion and a second portion second passage portion separated by a second portion partition, said second fluid directing portion matable with said first fluid directing portion such that said first portion first aperture is aligned with said second portion first passage portion to form a first runner portion, said first portion second passage portion alignable with said second portion second passage portion to form a second runner portion, said engagement member engageable with said second portion partition to substantially seal said first runner portion from said second runner portion without a weld.

2. The assembly as recited in claim 1, wherein said engagement member is substantially square in cross-section.

3. The assembly as recited in claim 1, wherein said engagement member extends along a length of each of said first partitions.

4. The assembly as recited in claim 1, wherein said engagement member extends along a length of each of said first partitions.

5. The assembly as recited in claim 1, wherein said fluid directing assembly defines an air intake module.

6. The assembly as recited in claim 1, wherein said engagement member provides an interference fit between said engagement member and said second portion partition.

7. The assembly as recited in claim 1, wherein said engagement member includes a plurality of engagement members extending from each of said first portion partition.

8. The assembly as recited in claim 1, wherein said weld is located about a mating periphery of said first and second fluid directing portion, said first plurality of partitions and said second plurality of partitions located within said mating periphery.

9. The assembly as recited in claim 1, wherein said engagement member penetrates said second portion partition.

10. The assembly as recited in claim 1, wherein said engagement member provides an interference fit through compliance of said engagement member with said second portion partition.

11. A fluid directing assembly for a vehicle comprising:

a first fluid directing portion including a first plurality of passage portions and a first plurality of partitions which separate each of said first plurality of passage portions, each of said first plurality of passage portions having an engagement member extending therefrom; and a second fluid directing portion attachable to said first fluid directing portion along a weld, said second fluid directing portion comprising a second plurality of passage portions and a second plurality of partitions which separate each of said second plurality of passage portions, said second fluid directing portion matable with said first fluid directing portion along a weld area such that said first plurality of passage portions are aligned with said second plurality of passage portions and said first plurality of partitions are aligned with said second plurality of partitions to form a plurality of runner portions, said engagement members engageable with said second plurality of partitions to separate each of said runner portions without a weld.

12. The assembly as recited in claim 11, wherein said plurality of runner portions define a first axis, said first plurality of partitions and said second plurality of partitions arranged substantially perpendicular to said first axis.

13. The assembly as recited in claim 11, wherein said engagement member provides an abutment fit between said engagement member and said second plurality of partitions.

14. The assembly as recited in claim 11, wherein said weld is located about a mating periphery of said first and second fluid directing portion, said first plurality of partitions and said second plurality of partitions located within said mating periphery.

15. The assembly as recited in claim 11, wherein said engagement member penetrates said second portion partition.

16. The assembly as recited in claim 11, wherein said engagement member provides an interference fit through compliance of said engagement member with said second portion partition.

17. A non-metallic air intake module for a vehicle comprising:

a first fluid directing portion including a first portion first passage portion and a first portion second passage portion separated by a first portion partition having an engagement member extending from said first portion partition; and a second fluid directing portion attachable to said first fluid directing portion along a weld, said second fluid directing portion comprising a second portion first passage portion and a second portion second passage portion separated by a second portion partition, said second fluid directing portion matable with said first fluid directing portion along a weld area such that said first portion first passage portion is aligned with said second portion first passage portion to form a first runner portion, said first portion second passage portion is aligned with said second portion second passage portion to form a second runner portion, and said engagement member engages said second portion partition to substantially seal said first runner portion from said second runner portion without a weld.

18. The assembly as recited in claim 17, wherein said engagement member provides an interference fit between said engagement member and said second plurality of partitions.

19. The assembly as recited in claim 17, wherein said engagement member is substantially square in cross-section.

20. The assembly as recited in claim 17, wherein said engagement member extends along a length of each of said first partitions.

21. The assembly as recited in claim 17, wherein said engagement members extend along a length of each of said first partitions.

22. The assembly as recited in claim 17, wherein said weld is located about a mating periphery of said first and second fluid directing portion, said first plurality of partitions and said second plurality of partitions located within said mating periphery.

23. The assembly as recited in claim 17, wherein said engagement member penetrates said second portion partition.

24. The assembly as recited in claim 17, wherein said engagement member provides an interference fit through compliance of said engagement member with said second portion partition.

* * * * *